United States Patent Office 3,461,523
Patented Aug. 19, 1969

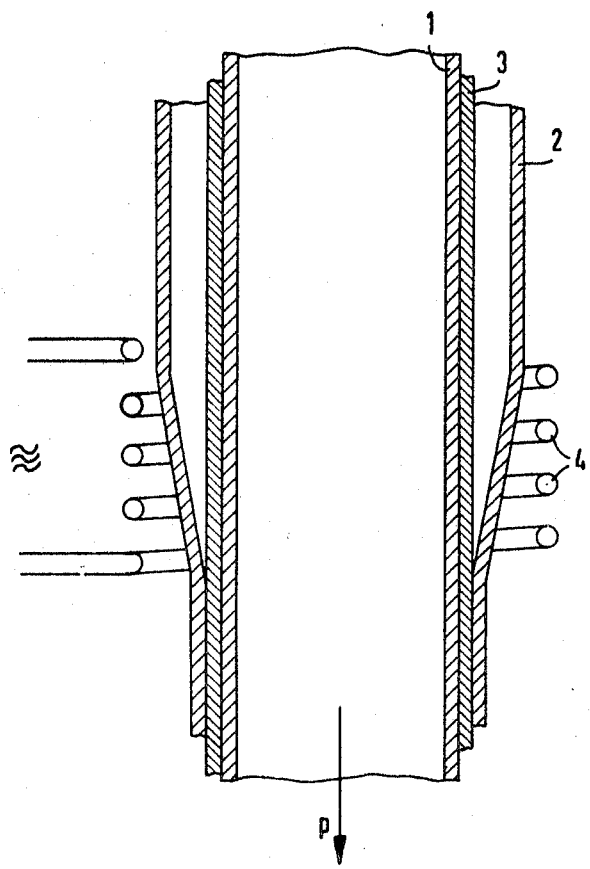

3,461,523
METHOD OF PRODUCING A MULTI-LAMINATED TUBE
Martin Peehs and Heinz Stehle, Erlangen, Germany, assignors to Siemens Aktiengesellschaft, Munich, Germany, a corporation of Germany
Filed Nov. 4, 1966, Ser. No. 592,193
Claims priority, application Germany, Nov. 6, 1965, S 100,398
Int. Cl. H01j 9/18; B23p 3/00
U.S. Cl. 29—25.13           8 Claims Our invention relates to method for producing a metallic multilaminated tube, and more particularly a tube of this type which has at least one electrically insulating layer.

Tubes of this general class are important in various fields of engineering, particularly when relatively good heat conductivity has to be maintained in spite of the electrical insulation. Such condition exists, for example, in the case of thermionic converters of the type disclosed in application Ser. No. 500,870, of K. Janner and D. Budnick, filed Oct. 22, 1965, and assigned to the same assignee as that of the instant application, wherein cylindrical thermionic diodes are connected in series and the endmost individual anodes have to be insulated both from one another as well as from a common anode casing tube while they are simultaneously in good heat contact with a coolant. Heretofore, such insulated tubes could be produced only by the aid of soldering techniques. A disadvantage that resulted from the use of such techniques was that the operating temperature was limited due to the use of the relatively low-melting solder. Furthermore, the solder is susceptible to corrosion when subjected to cesium atmospheres.

It is accordingly an object of our invention to provide a method of producing multilaminated tubes which avoids the disadvantage of the heretofore known methods. More particularly, it is an object of our invention to produce such tubes without employing low-temperature soldering techniques and to accordingly avoid restriction of the method to low operating temperatures.

With the foregoing and other objects in view, we provide, in accordance with our invention, a method of producing a metallic multilaminated tube which comprises shrink-fitting a metallic tube by progressive zone heating and stressing of the tube in tension on a respective adjacent inner tube, and which also comprises spraying an insulating layer on the inner tube in an intermediate step.

In accordance with a further feature of our invention, the insulating layer can consist of a ceramic such as aluminum oxide ($Al_2O_3$), zirconium oxide ($ZrO_2$) or beryllium oxide (BeO) applied by a plasma spray method. With such a method, metallizing of the ceramic, which is necessary in soldering techniques, is dispensed with and, moreover, ceramic layers of such thinness are able to be produced as have not heretofore been possible with the previously known techniques.

Other features which are considered as characteristic for the invention are set forth in the appended claims.

Although the invention is illustrated and described herein as method for producing a metallic multilaminated tube, it is nevertheless not intended to be limited to the details shown since various modifications may be made therein without departing from the spirit of the invention and within the scope and range of equivalents of the claims.

The method of operation of the invention, however, together with additional objects and advantages thereof, will be best understood from the following description when read in connection with the accompanying single figure of the drawing which shows a multilaminated tube produced in accordance with the method of the invention and a component of apparatus employed in carrying out the method.

In the figure, there is schematically shown an insulated three-layer tube produced in accordance with the method of our invention. An inner hollow tube 1 may be, for example, the anode of a thermionic diode. The tube 1 is coated with a layer 3 of aluminum oxide by a conventional plasma spray method, for example. After the desired thickness of the insulating layer has been achieved, the insulating layer is externally worked by polishing so that a close junction or union is afforded the tube 2 that is to be fitted thereon. The tube 2 which joins together thermionic diodes, for example, that are electrically connected in series, and which may be later wetted on its outer surface by a flow of coolant to the anodes of the thermionic diodes, initially has a somewhat larger diameter than the previously coated inner anode tube. The tube 2 is heated at a location thereof with the aid of a high-frequency induction coil 4 to a temperature at which it attains a substantially plastic state, and tensile stress is applied in the direction of the arrow P simultaneously for deforming the plastic portion of the tube 2 and tightly fitting the tube onto the previously formed two-layer tube 1, 3. By passing the tube assembly 1, 3, 2 axially through the induction coil 4 or, conversely, passing the induction coil 4 along the tube assembly, the incandescently heated plastic zone of the tube 2, which is to be mounted on the insulation-laminated tube 1, is continuously passed along the length of the tube 2 so that, at the end of the operation, the tube 2 is completely shrunk onto the insulation-coated inner tube 1. By the foregoing method there is achieved a close junction between the metallic inner tube 1 and the metallic outer tube 2, which can consist of niobium metal in the case of thermionic converters, with the ceramic layer 3 therebetween. The resulting multilaminated tube has, in addition to relatively good heat conductivity, a further advantage, in that the electrical insulation is not lost even if the ceramic layer tends to crumble in places, because no hollow spaces at all are left between the walls of the laminated tube because of the special production method of our invention. For the use of such laminated tubes, for example, in the above-mentioned field of thermionic converters, it is expedient to seal off the ceramic layers gas-tightly at the ends of the tube. This can be effected by glazing, enameling or also in the course of the assembly of the devices connected therewith.

The foregoing method of our invention naturally has no limitations with regard to the number of laminations or layers which can be used in forming the tube, and can obviously be employed for producing other workpieces which call for a good electrical and heat resistant insulation. It is also possible to replace the inner tube 1 by a solid rod such as for example an electrical conductor. It can also be expedient for special applications, to de-gas the ceramic layers sprayed on the inner tube or rod before the next metallic layer is fitted thereon in vacuum, and finally to carry out the fitting of the next metallic layer on the insulation-coated inner tube or rod in vacuum or in a special protective gas atmosphere.

As an example, an outer tube of niobium having a diameter of 26 mm. was slipped around an inner anode tube of a thermionic converter having an outer diameter of 25 mm., and coated by plasma-spray process with a 0.2 mm. layer of aluminum oxide. The outer tube was heated to a temperature of 950° C. and pressed toward the inner tube with a tensile strength of 400–500 kg. applied to the outer tube in the longitudinal direction thereof, the heat and pressure having been applied locally along the length of the outer tube until the tubes were tightly fitted together.

We claim:
1. Method of producing a multilaminated tube having at least one electrically insulating lamination, which comprises spraying a layer of insulating material on an elongated metallic member, moving the insulation-coated metallic member and a hollow metallic tube, having an inner diameter greater than the outer diameter of the insulation-coated member, axially relative to one another so as to locate the metallic tube around the insulation-coated member, heating the metallic tube in zones progressively along the length thereof to a temperature at which the material of the metallic tube is in plastic state, and simultaneously applying tensile stress to the metallic tube in the longitudinal direction thereof so as to deform the plastic material in the heated zones whereby the metallic tube is shrink-fitted onto the insulation-coated metallic member.

2. Method according to claim 1 wherein the insulating material consists of ceramic.

3. Method according to claim 2 wherein the ceramic is selected from the group consisting of $Al_2O_3$, $ZrO_2$ and BeO.

4. Method according to claim 3 wherein the ceramic is sprayed on the elongated metallic member by a plasma spray process.

5. Method according to claim 1 wherein the insulating material consists of ceramic, and the method also comprises degassing the ceramic layer in vacuo before shrink-fitting the outer metallic tube onto the ceramic-coated metallic member.

6. Method according to claim 5 wherein the metallic tube is shrink-fitted onto the insulation-coated metallic member in vacuo.

7. Method according to claim 1 wherein the elongated metallic member consists of an inner hollow metallic tube.

8. Method according to claim 7 for producing anode tubes of cylindrical thermionic converters, wherein the hollow inner and outer metallic tubes are formed of niobium.

References Cited
UNITED STATES PATENTS

| | | |
|---|---|---|
| 2,609,595 | 9/1952 | Rossheim. |
| 2,781,308 | 2/1957 | Creutz et al. |
| 3,009,484 | 11/1961 | Dollens. |
| 3,010,355 | 11/1961 | Cutforth. |
| 3,318,340 | 5/1967 | Torti _____ 138—140 |
| 3,368,084 | 2/1968 | Hall _____ 310—4 |
| 3,279,028 | 10/1966 | Hall et al. _____ 310—4 X |

CHARLIE T. MOON, Primary Examiner

U.S. Cl. X.R.

29—447, 458, 516, 520, 573; 138—146